(12) United States Patent
Choi et al.

(10) Patent No.: US 9,979,333 B2
(45) Date of Patent: May 22, 2018

(54) INVERTER

(71) Applicant: LSIS CO., LTD., Gyeonggi-do (KR)

(72) Inventors: Seung-Cheol Choi, Gyeonggi-do (KR);
Anno Yoo, Gyeonggi-do (KR)

(73) Assignee: LSIS CO., LTD., Anyang-si,
Gyeonggi-Do (KR)

( * ) Notice: Subject to any disclaimer, the term of this patent is extended or adjusted under 35 U.S.C. 154(b) by 0 days. days.

(21) Appl. No.: 15/357,285

(22) Filed: Nov. 21, 2016

(65) Prior Publication Data

US 2017/0294855 A1    Oct. 12, 2017

(30) Foreign Application Priority Data

Apr. 7, 2016 (KR) .................. 10-2016-0042919

(51) Int. Cl.
| H02P 1/04 | (2006.01) |
| H02P 23/00 | (2016.01) |
| H02P 6/20 | (2016.01) |
| H02P 1/02 | (2006.01) |
| H02P 27/06 | (2006.01) |
| H02P 29/024 | (2016.01) |
| H02M 7/483 | (2007.01) |

(52) U.S. Cl.
CPC .............. H02P 6/20 (2013.01); H02P 1/029 (2013.01); H02P 27/06 (2013.01); *H02M 2007/4835* (2013.01); *H02P 29/025* (2013.01)

(58) Field of Classification Search
None
See application file for complete search history.

(56) References Cited

U.S. PATENT DOCUMENTS 4,642,546 A * 2/1987 Schonherr ............. H02P 29/025
                                                                318/798
2012/0001587 A1    1/2012 Kono et al.

FOREIGN PATENT DOCUMENTS

| EP | 2958227 A2 | 12/2015 |
| JP | H0654586 A | 2/1994 |
| JP | H0888996 A | 4/1996 |
| JP | H1042590 A | 2/1998 |
| JP | H1066386 A | 3/1998 |
| JP | 2001112247 A | 4/2001 |
| JP | 2001136787 A | 5/2001 |
| JP | 2015070704 A | 4/2015 |

OTHER PUBLICATIONS

European search report dated Aug. 23, 2017 for corresponding EP application 16193104.3.
Japanese Office Action for related Japanese Application No. 2016-217645; dated Feb. 6, 2018; (3 pages).

* cited by examiner

*Primary Examiner* — Bentsu Ro
*Assistant Examiner* — Zemenay Truneh
(74) *Attorney, Agent, or Firm* — K&L Gates LLP

(57) ABSTRACT

The present disclosure relates to an inverter, and more specifically to an inverter that can be restarted stably by determining whether to restart it when power is supplied after a failure has occurred in the inverter due to a fault in the main supply.

11 Claims, 7 Drawing Sheets

PRIOR ART

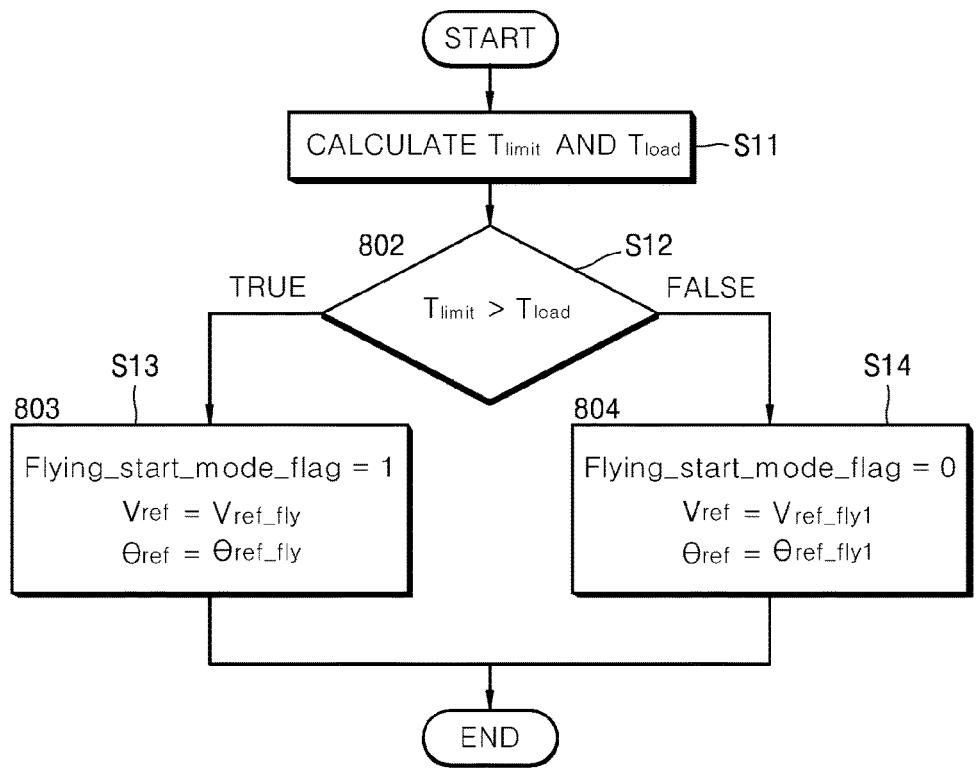

INVERTER

CROSS REFERENCE TO RELATED APPLICATION

This application claims the benefit of Korean Patent Application No. 10-2016-0042919, filed on Apr. 7, 2016, entitled "INVERTER", which is hereby incorporated by reference in its entirety into this application.

BACKGROUND

1. Technical Field

The present disclosure relates to an inverter, and more specifically to an inverter that can be restarted stably by determining whether to restart it when power is supplied after a failure has occurred in the inverter.

2. Description of the Related Art

A medium-voltage inverter uses an input power having a line-to-line voltage RMS value of 600 V or higher and has a rating power capacity of several hundred kW to several tens of MW. Inverters are commonly employed in applications such as fans, pumps, compressors, etc.

As circuits of inverters, multi-level inverters that generate output voltage of three or more levels are commonly used. For example, a cascaded H-bridge (CHB) inverter is known.

The cascaded H-bridge inverter includes unit power cells whose outputs are connected in series and has advantages in that dv/dt is low and total harmonic distortion (THD) is good due to a variety of output voltages. In addition, it is easy to maintain.

Further, the magnitude and the number of levels of the inverter output voltage are determined based on the number of power cells of the cascaded H-bridge inverter. Each of the power cells uses isolated input voltage.

FIG. 1 is a diagram for illustrating a cascaded H-bridge inverter in the related art.

Referring to FIG. 1, the cascaded H-bridge inverter 100 includes a main supply 102, a phase shift transformer 104, a plurality of power cells 106, an electric motor 108, and a voltage sensing device. The cascaded H-bridge inverter consists of unit power cells of two-stage. The number of the unit power cells 106 may vary depending on the system requirements.

The main supply 102 represents a three-phase voltage having a line-to-line voltage RMS value of 600 V or higher.

The phase shift transformer 104 isolates the main supply 102 and converts the phase and magnitude of the voltage as required by the unit power cells 106. In addition, the phase shift transformer 104 improves the total harmonic distortion (THD) of the input current flowing in the main supply 102 by shifting the phases.

The power cells 106 may use the output voltages from the phase shift transformer 104 as their own input power.

The electric motor 108 receives the output voltage from the inverter 100. The output voltage is synthesized with the sum of outputs from the power cells in different phases. The electric motor 108 may include an induction machine or a synchronous machine as the medium-voltage three-phase electric motor.

The voltage sensing device 112 measures the output voltage from the inverter 100 in the normal driving state. The measured output voltage is used for synchronous bypass and output power calculation. In addition, it is used for restarting the electric motor 108 after there is a fault in the main supply.

The phase-a output voltage of the inverter 100 is equal to the sum of output voltages from a first power cell 106a1 and a second power cell 106a2 in series connection. The phase-b output voltage of the inverter 100 is equal to the sum of output voltages from a third power cell 106b1 and a fourth power cell 106b2. The phase-c output voltage of the inverter 100 is equal to the sum of output voltages from a fifth power cell 106c1 and a sixth power cell 106c2. The phase voltages of the output voltages of the inverter 100 have the same magnitude but have phase difference of 120 degrees.

The electric motor 108 driven by the inverter 100 has large capacity and thus has large inertia. Accordingly, after there is a fault in the main supply or a blackout takes place, it takes long hours to wait until the rotor of the induction machine stops for stable restarting.

To overcome this problem, there has been proposed an approach that the velocity and torque of the induction machine is controlled while the induction machine is rotating without any control algorithm. According to this approach, however, inrush current may be created, such that the inverter 100 or the electric motor 108 may fail.

In addition, when the inverter is restarted under a load, it is determined whether to restart it based on the residual voltage of the induction machine. The larger the residual voltage is, the larger voltage available for restarting is, and thus the magnitude of current required in restarting can be greatly reduced.

However, the smaller the residual voltage is, the less voltage available for restarting. and thus the magnitude of current required in generating the torque is increased. Accordingly, it affects adversely the electric motor system to restart when the residual voltage is small, and thus it is stable to start it after driving has been stopped.

SUMMARY

It is an aspect of the present disclosure to provide an inverter that can be restarted stably by determining whether to restart it when power is supplied after a failure has occurred in the inverter due to a fault in a main supply.

It is another aspect of the present disclosure to provide an inverter that determines whether to restart it based on the voltage of an electric motor in free rotation, to prevent failure in the inverter or the electric motor.

It is another aspect of the present disclosure to provide an inverter determines whether to restart it based on induced electromotive force of an electric motor, to restart the electric motor in a restart zone without inrush current.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, an inverter that outputs voltage for driving an electric motor includes: a first restart voltage reference generator configured to receive three phase currents output from the electric motor and a frequency of the inverter and a rating current of the motor to output a first restart voltage and a first restart phase angle; a second restart voltage reference generator configured to receive an inverter output voltage output from the inverter to output a second restart voltage and a second restart phase angle; and a switch unit configured to the first restart voltage, the first restart phase angle, the second restart voltage and the second restart phase angle to output a restart voltage and a phase angle according to a restart flag.

The frequency of the inverter may be measured at a start point of a restart zone in which the inverter is restarted.

The maximum load torque generated by the electric motor and a load torque in the restart zone may be calculated.

The maximum load torque may be calculated by multiplying the second restart voltage, a maximum rating current of the electric motor and a power factor, and dividing it by a restart velocity.

The load torque may be calculated by dividing a magnitude of the inverter output voltage, a magnitude of a torque component current of the electric motor and a restart velocity output from the second restart voltage reference generator.

The maximum load torque may be compared with the load torque, and the restart mode flag may be set based on the comparison result.

The restart mode flag may be set to one if the maximum load torque is larger than the load torque, and the switch unit may output the second restart voltage and the second phase angle to the inverter.

The restart mode flag may be set to zero if the maximum load torque is smaller than the load torque, and the switch unit may output the first restart voltage and the first phase angle to the inverter.

The first restart voltage reference may include: a first voltage generator configured to receive an output frequency of the inverter to generate the first restart voltage; and a first phase angle generator configured to receive a rating current of the motor and three phase currents output from the electric motor to generate the first restart phase angle.

The first phase angle generator may include: a first adder configured to add the rating current of the motor with the three phase currents output from the electric motor to output it; an amplifier configured to adjust the result output from the first adder depending on a predetermined gain to output it; and a first integrator configured to integrate the result output from the amplifier to output it as the first restart phase angle.

The second restart voltage reference generator may include: a voltage sensing unit configured to sense voltage output from the inverter; a voltage measuring unit configured to receive the voltage sensed by the voltage sensing unit to output a d-axis voltage and a q-axis voltage on a stationary reference frame; a voltage and phase detector configured to receive the d-axis voltage and the q-axis voltage to output a restart voltage, a restart phase angle and a restart velocity; and a restart voltage generator configured to receive the restart voltage, the restart phase angle and the restart velocity to output the second restart voltage and the second restart phase angle.

According to an exemplary embodiment of the present disclosure, the inverter determines whether to restart inverter if there is a fault in the main supply of the inverter, such that the inverter can be restarted stably.

In addition, according to another exemplary embodiment of the present disclosure, the inverter determines whether to restart an inverter based on the voltage of an electric motor in free rotation, such that it is possible to prevent failure in the inverter or the electric motor.

In addition, according to another exemplary embodiment of the present disclosure, the inverter determines whether to restart an inverter based on induced electromotive force of an electric motor, such that it is possible to restart the electric motor in a restart section without inrush current.

BRIEF DESCRIPTION OF DRAWINGS

FIG. 7 is a flow chart for illustrating operation of the medium-voltage inverter in a restart zone according to an exemplary embodiment of the present disclosure.

DETAILED DESCRIPTION

Figure 1:
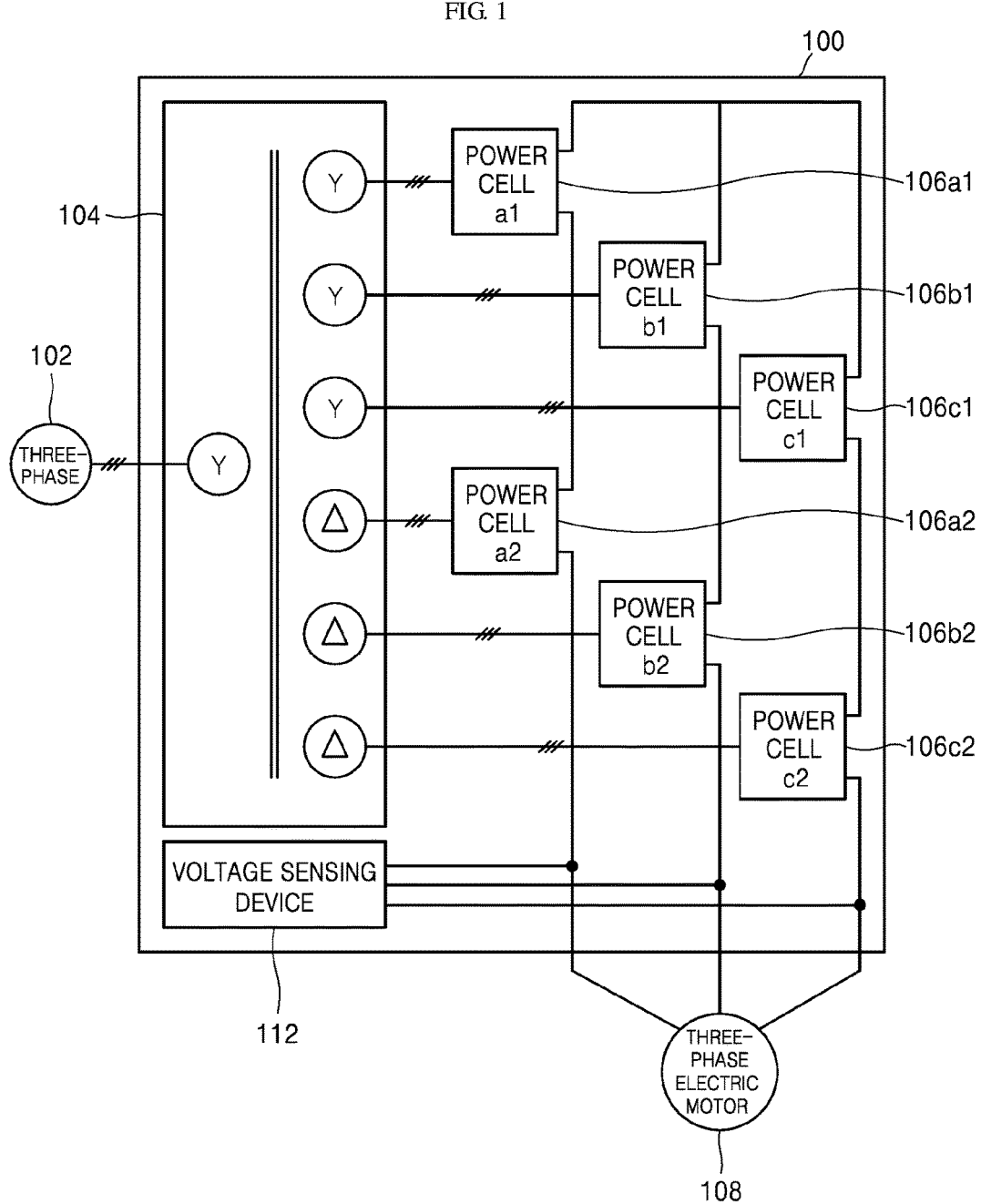
FIG. 1 is a diagram for illustrating a cascaded H-bridge inverter in the related art.

The above objects, features and advantages will become apparent from the detailed description with reference to the accompanying drawings. Embodiments are described in sufficient detail to enable those skilled in the art in the art to easily practice the technical idea of the present disclosure. Detailed disclosures of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 2:
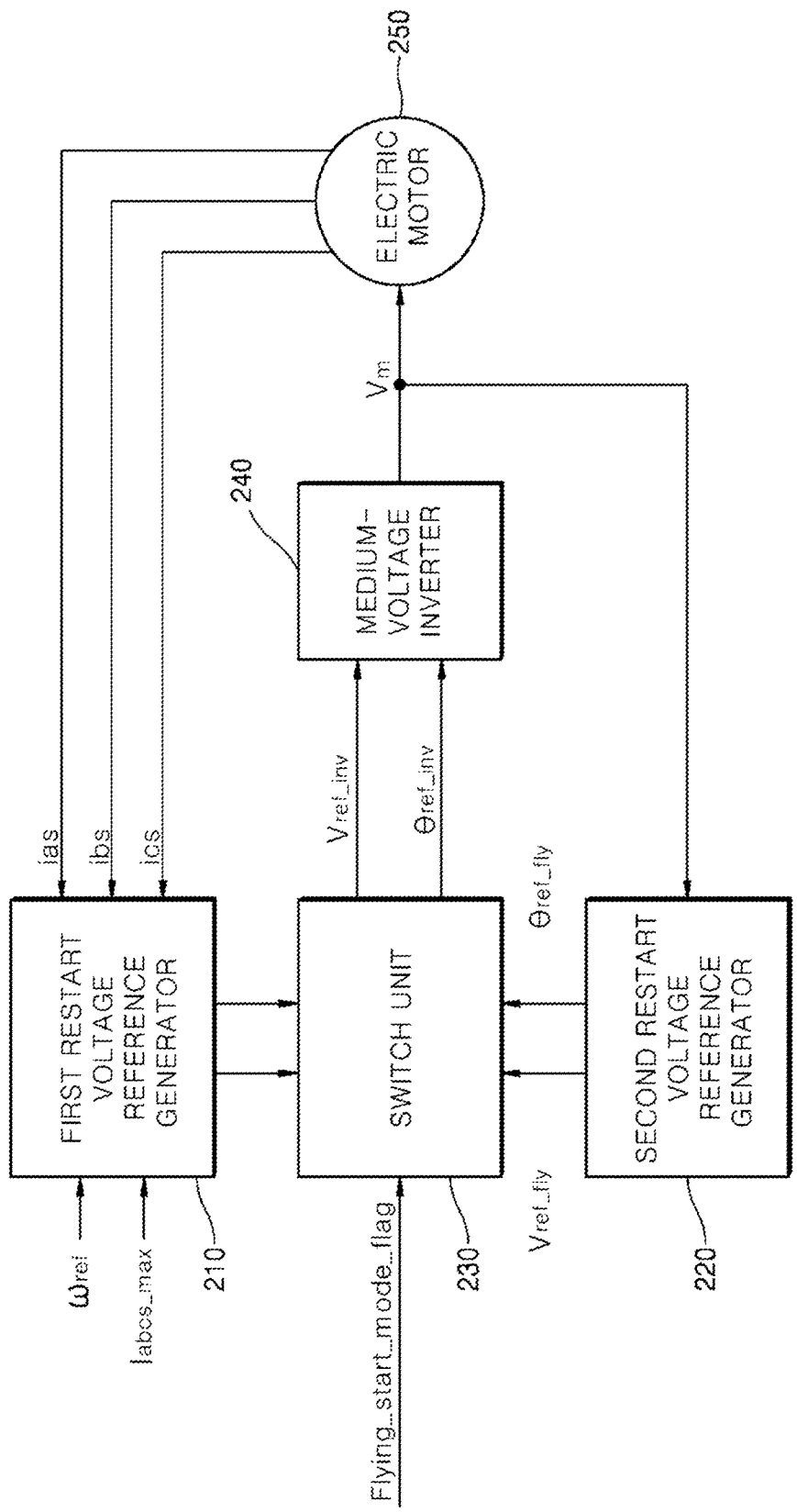
FIG. 2 is a block diagram of an inverter according to an exemplary embodiment of the present disclosure.

FIG. 2 is a block diagram of an inverter according to an exemplary embodiment of the present disclosure.

Referring to FIG. 2, the inverter according to the exemplary embodiment of the present disclosure includes a first restart voltage reference generator 210, a second restart voltage reference generator 220, a switch unit 230, a medium-voltage inverter 240, and an electric motor 250.

The first restart voltage reference generator 210 may be operated after a failure takes place due to a fault in the main supply of the medium-voltage inverter 240.

In addition, the first restart voltage reference generator 210 receives the frequency $\omega_{ref}$ of the medium-voltage inverter 240, the rating current of the motor $I_{abcs\_max}$, and three phase currents $i_{as}$, $i_{bs}$, $i_{cs}$ output from the electric motor 250 and outputs a first restart voltage $V_{ref\_fly1}$ and a first restart phase angle $\theta_{ref\_fly1}$. The frequency $\omega_{ref}$ of the medium-voltage inverter 240 is measured at the start point of a restart driving zone. The first restart voltage $V_{ref\_fly1}$ may be a DC voltage.

The second restart voltage reference generator 220 may be operated after a failure takes place due to a fault in the main supply of the medium-voltage inverter 240.

In addition, the second restart voltage reference generator 220 receives an inverter output voltage $V_m$ output from the medium-voltage inverter 240 and outputs a second restart voltage $V_{ref\_fly}$ and a second restart phase angle $\theta_{ref\_fly1}$.

The switch unit 230 operates according to a restart mode flag flying_start_mode_flag. In addition, the switch unit 230 receives the first restart voltage $V_{ref\_fly1}$ and the first restart phase angle $\theta_{ref\_fly1}$ of the first restart voltage reference generator 210, and the second restart voltage $V_{ref\_fly}$ and the second restart phase angle θ$_{ref\_fly}$ of the second restart voltage reference generator 220.

If the restart mode flag flying_start_mode_flag is zero, the switch unit 230 applies the first restart voltage V$_{ref\_fly1}$ and the first restart phase angle θ$_{ref\_fly1}$ of the first restart voltage reference generator 210 to the medium-voltage inverter 240.

If the restart mode flag flying_start_mode_flag is one, on the other hand, the switch unit 230 applies the second restart voltage V$_{ref\_fly}$ and the first restart phase angle θ$_{ref\_fly1}$ of the second restart voltage reference generator 220 to the medium-voltage inverter 240. When the restart flag flying_start_flag is one, it indicates that there is a fault in the main supply or a blackout takes place.

The medium-voltage inverter 240 receives the inverter voltage V$_{ref\_fly}$ and the phase angle θ$_{ref\_inv}$ output from the switch unit 230 to output electric motor voltage V$_m$. The electric motor voltage V$_m$ thus generated is applied to the electric motor 250. The electric motor voltage V$_m$ may be an AC voltage.

The electric motor 250 is operated by receiving the electric motor voltage V$_m$ output from the medium-voltage inverter 240. The electric motor voltage V$_m$ may be in the form of pulse width modulation (PWM).

Hereinafter, the first restart voltage generator will be described in detail below with reference to FIG. 3.

Figure 3:
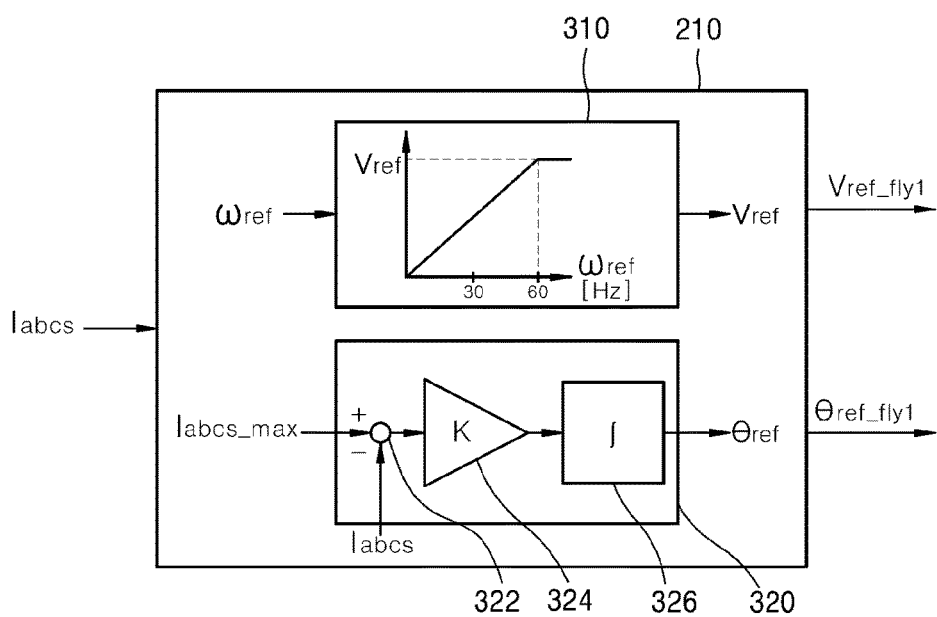
FIG. 3 is a block diagram of a first restart voltage generator according to an exemplary embodiment of the present disclosure.

FIG. 3 is a block diagram of a first restart voltage generator according to an exemplary embodiment of the present disclosure.

Referring to FIG. 3, the first restart voltage reference generator 210 according to the exemplary embodiment of the present disclosure includes a first voltage generator 210 and a first phase angle generator 320.

The first voltage generator 310 receives output frequency ω$_{ref}$ of the medium-voltage inverter 240 to generate a first restart voltage V$_{ref\_fly1}$.

The first phase angle generator 320 includes a first adder 322, an amplifier 324, and a first integrator 326.

The first adder 322 receives the rating current of the motor I$_{abcs\_max}$ and three phase currents i$_{as}$, i$_{bs}$ and i$_{cs}$ output from the electric motor 250 to output a result of adding calculation via the first adder 322. The amplifier 324 receives the result of the adding calculation output from the first adder 322 and adjusts it depending on a predetermined gain to output the adjusted result. The first integrator 326 receive the result output from the amplifier 324 and conducts integration calculation on it to output it as the first restart phase angle θ$_{ref\_fly1}$.

Hereinafter, the second restart voltage reference generator will be described in detail below with reference to FIG. 4.

Figure 4:
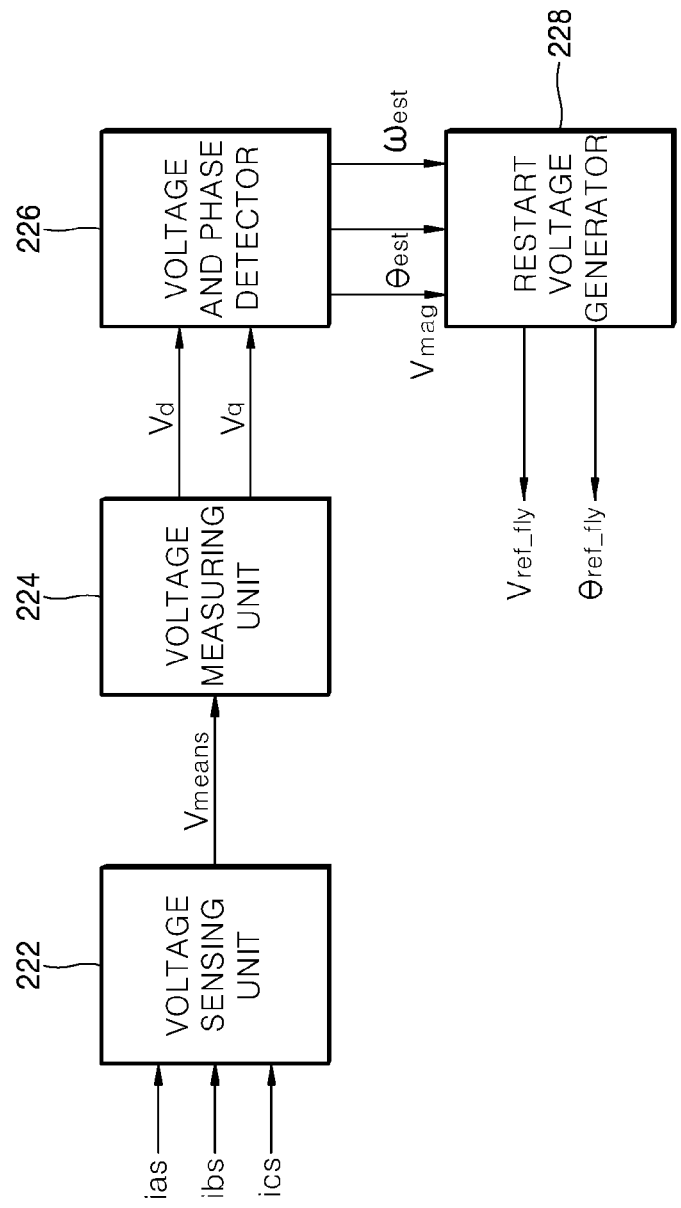
FIG. 4 is a block diagram of a second restart voltage reference generator according to an exemplary embodiment of the present disclosure.

FIG. 4 is a block diagram of a second restart voltage reference generator according to an exemplary embodiment of the present disclosure.

Referring to FIG. 4, the second restart voltage reference generator 220 according to the exemplary embodiment of the present disclosure includes a voltage sensing unit 222, a voltage measuring unit 224, a voltage and phase detecting unit 226, and a restart voltage generating unit 228.

The voltage sensing unit 222 measures the voltage output from the medium-voltage inverter 240 in the normal driving state. The voltage V$_m$ output from the medium-voltage inverter 240 is information used for restarting the electric motor 250 and are used in synchronous bypass and output power calculation. In addition, when there is a fault in the main supply or a blackout takes place, the voltage V$_m$ is used for restart the electric motor 250.

In order to estimate the magnitude and phase of the input voltage of the electric motor 250, the voltage measuring unit 224 receives inverter output voltage V$_m$ measured by the voltage sensing unit 222 to output a d-axis voltage V$_d$ and a q-axis voltage V$_q$ on the stationary reference frame. In doing so, the voltage measuring unit 224 performs reference frame transformation to thereby convert the measured three-phase inverter output voltage V$_{means}$ into the d-axis voltage V$_d$ and the q-axis voltage V$_q$. The voltage measuring unit 224 may include a voltage sensing unit or resistor, etc.

The voltage and phase detecting unit 226 receives the d-axis voltage V$_d$ and the q-axis voltage V$_q$ output from the voltage measuring unit 224 to output a restart voltage V$_{mag}$, a restart phase angle θ$_{est}$, and restart velocity west. The restart voltage V$_{mag}$ may be calculated by squaring the d-axis voltage V$_d$ and the q-axis voltage V$_q$ on the stationary reference frame to add them and obtain square roots of the sum. Further, the restart phase angle θ$_{est}$ and the restart velocity west may be implemented by using a phase loop lock (PLL).

The restart voltage generating unit 228 receives the restart voltage V$_{mag}$, the restart phase angle θ$_{est}$ and the restart west output from the voltage and phase detecting unit 226 to output a second restart voltage V$_{ref\_fly}$ and a second restart phase angle θ$_{ref\_fly}$.

Hereinafter, the restart voltage generator will be described in detail below with reference to FIG. 5.

Figure 5:
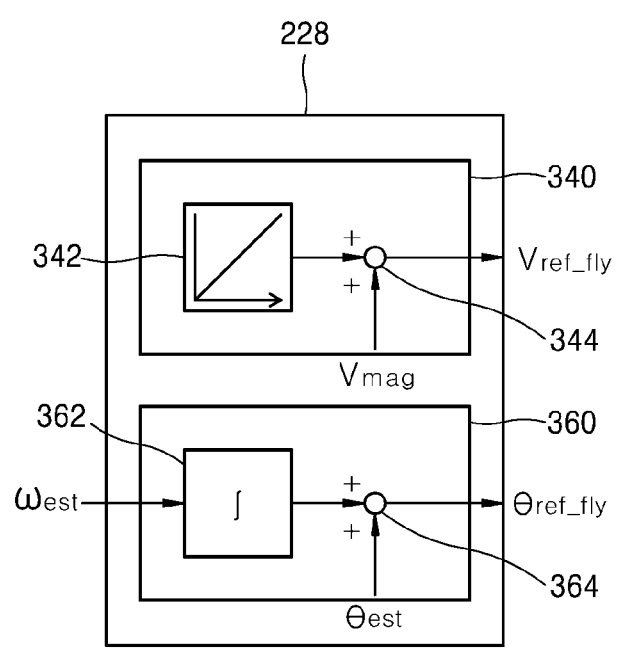
FIG. 5 is block diagram of a restart voltage reference generator according to an exemplary embodiment of the present disclosure.

FIG. 5 is block diagram of a restart voltage reference generator according to an exemplary embodiment of the present disclosure.

Referring to FIG. 5, the restart voltage generating unit 228 according to the exemplary embodiment of the present disclosure includes a second voltage generator 340 and a second phase angle generator 360.

The second voltage generator 340 includes a slope 342 of the voltage input by a user, and a second adder 344. The slope 342 of the voltage may be a constant value. The second voltage generator 340 adds the slope 342 of the voltage input by the user with the restart voltage V$_{mag}$ output from the voltage and phase detector 266 via the second adder 344 to output it as the second restart voltage V$_{ref\_fly}$. The second restart voltage V$_{ref\_fly}$ may be expressed as follows:

$$V_{ref\_fly} = V_{mag} + a \cdot t \quad (1)$$

where V$_{mag}$ denotes a restart voltage output from the voltage and phase detecting unit 226, and a denotes the slope of voltage input by the user.

The second phase angle generator 360 includes a second integrator 362 and a third adder 364. The second integrator 362 receives a restart velocity west output from the voltage and phase detecting unit 226 and integrates the restart velocity west to output it. The third adder 364 adds the integration value output from the second integrator 342 with the restart phase angle θ$_{est}$ output from the voltage and phase detecting unit 226 to output it as a second restart phase angle θ$_{ref\_fly}$. The second restart phase angle θ$_{ref\_fly}$ may be expressed as follows:

$$\theta_{ref\_fly} = \theta_{est} + \leftarrow \omega_{est} dt \quad (2)$$

where θ$_{est}$ denotes a restart phase angle, and ω$_{est}$ denotes a restart velocity output from the voltage and phase detecting unit 226.

Figure 6:
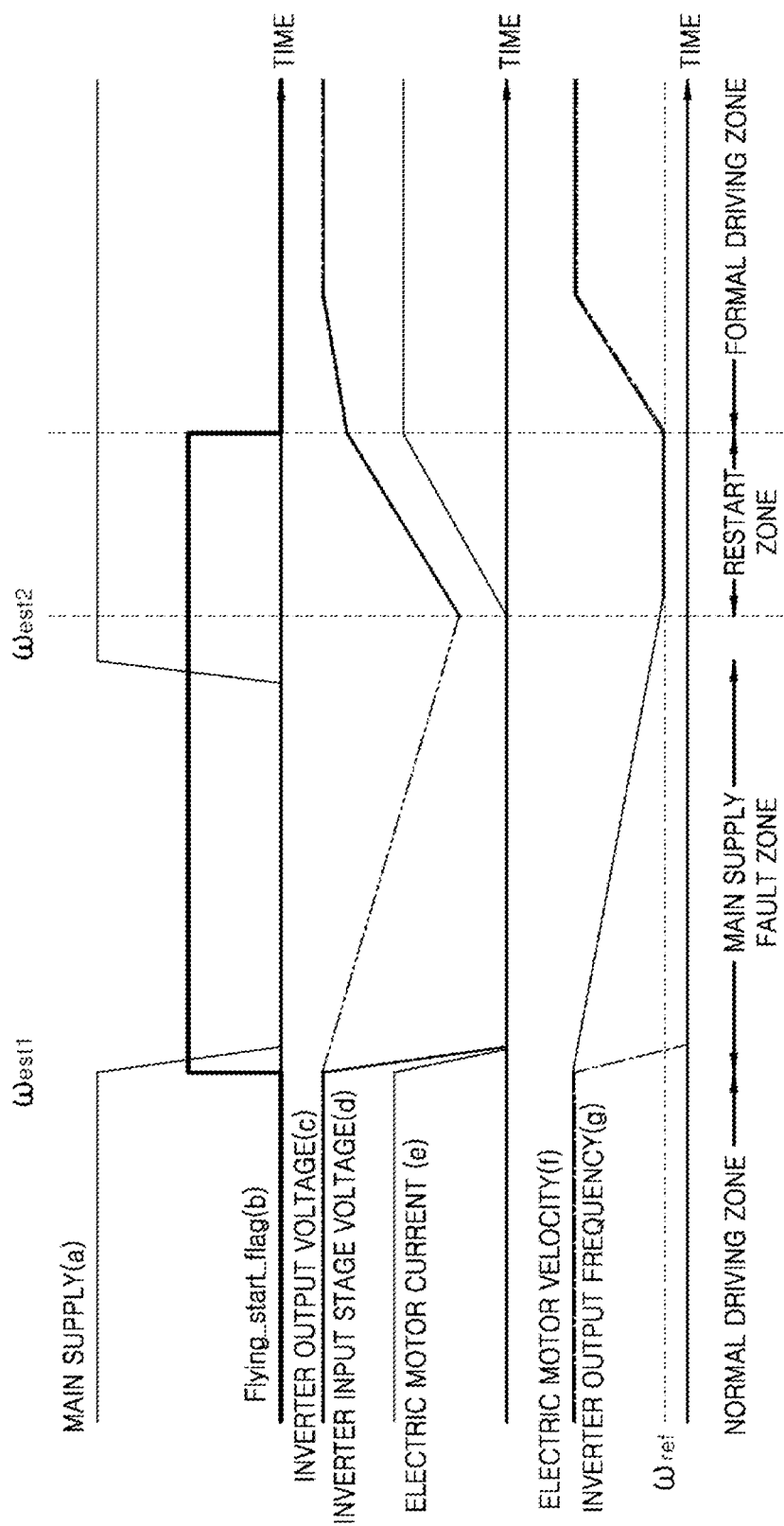
FIG. 6 is a timing chart showing operation of a medium-voltage inverter according to an exemplary embodiment of the present disclosure.

FIG. 6 is a timing chart showing operation of a medium-voltage inverter according to an exemplary embodiment of the present disclosure. FIG. 7 is a flow chart for illustrating operation of the medium-voltage inverter in a restart zone according to an exemplary embodiment of the present disclosure.

Referring to FIG. 6, in the medium-voltage inverter 240 according to the exemplary embodiment of the present disclosure, the restart flag flying_start_flag is set to zero in the normal driving zone where input voltage and output voltage both are normally driven. The restart flag flying_start_flag is a variable that indicates a zone in which operations for restarting the medium-voltage inverter, and a zone from the time of the fault to the normal driving.

The input power (a) indicates the magnitude of the maintain supply of the medium-voltage inverter 240, and the inverter output voltage (c) indicates the magnitude of the output voltage $V_m$ of the medium-voltage inverter 240. Accordingly, when there is a fault in the main supply, the medium-voltage inverter 240 stops outputting for safety purpose.

In addition, the magnitude (a) of the main supply in the main supply fault zone of the medium-voltage inverter is operated below the rated voltage range, and the input stage voltage (d) of the electric motor measured in this zone is the induced electromotive force of the electric motor. The measured magnitude of the input stage voltage (d) of the electric motor and the velocity (f) of the electric motor decrease depending on a load and the time constant of the electric motor, and no path for the electric motor current (e) is formed. The restart flag flying_start_flag is set to one.

In the restart zone of the medium-voltage inverter 240, the medium-voltage inverter that has been interrupted due to a fault in the main supply (a) is restarted.

In the medium-voltage inverter according to another exemplary embodiment of the present disclosure, the main supply fault zone in association with the rated voltage. More specifically, the medium-voltage inverter may set the main supply fault zone to a voltage range below the rated voltage. For example, the main supply fault zone may be set to the voltage range below the line-to-line voltage RMS value of 600 V.

Referring to FIG. 7, in order to restart the medium-voltage inverter 240, the maximum load torque $T_{limit}$ the electric motor can generate depending on the magnitude of the induced electromotive force of the electric motor and a load torque $T_{load}$ are calculated in the restart zone (step S11). The maximum load torque Tlimit can be expressed as follows:

$$T_{limit}=3/2 V_{mag} \cdot I_{rate} \cdot PF/\omega_{est} \quad (3)$$

Equation 3 calculates electric torque from power equation. It represents the maximum torque that can be restarted under residual voltage. As can be seen from Equation 3, $I_{rate}$ increases as the restart voltage $V_{mag}$ decreases under the same torque $T_{limit}$.

The $V_{mag}$ denotes a restart voltage output from the voltage and phase detecting unit 226, $I_{rate}$ denotes the maximum rating current of the electric motor, and PF denotes power factor. The $I_{rate}$ may increase the magnitude of the current within the tolerance of the medium-voltage inverter and the electric motor.

The load torque $T_{load}$ can be expressed as follows:

$$T_{load}=3/2 V_{qse} \cdot I_{qse}/\omega_{est} \quad (4)$$

Equation 4 represents inverter output torque, calculates a torque $T_{load}$ before the fault zone of the medium-voltage inverter 240, compares it with the maximum load torque $T_{limit}$ in Equation 3 in the fault zone, and performs different restart algorithms depending on the comparison results.

The $V_{qse}$ denotes the q-axis voltage on the synchronous reference frame and represents the magnitude of the output voltage from the medium-voltage inverter 240. The $I_{qse}$ denotes the magnitude of a torque component current, and the west denotes a restart velocity output from the voltage and phase detecting unit 226. The restart velocity corresponds to the rotor speed and represents the frequency of induced electromotive force estimated by the voltage and phase detecting unit 226.

Subsequently, the calculated maximum load torque $T_{limit}$ and the load torque $T_{load}$ are compared with each other (step S12). The result value of the comparator corresponds to the variable of a restart mode flag flying_start_mode_flag.

If the maximum load torque $T_{limit}$ is larger than the load torque $T_{load}$, the restart mode flag flying_start_mode_flag is set to one, such that a restart algorithm based on the induced electromotive force is executed. In response to the restart mode flag flying_start_mode_flag, the switch unit 230 applies the second restart voltage $V_{ref\_fly}$ and the second restart phase angle $\theta_{ref\_fly}$ generated in the second restart voltage reference generator 220 to the medium-voltage inverter 240. The medium-voltage inverter 240 is restarted as the second restart voltage $V_{ref\_fly}$ and the second restart phase angle $\theta_{ref\_fly}$ are applied thereto (step S13).

If the maximum load torque $T_{limit}$ is smaller than the load torque $T_{load}$, on the other hand, the induced electromotive force is insufficient. Accordingly, the restart mode flag flying_start_mode_flag is set to zero, the electric motor is interrupted in order to prevent the medium-voltage inverter 240 or the electric motor from being damaged, or another restart algorithm is executed. In response to the restart mode flag flying_start_mode_flag, the switch unit 230 applies the first restart voltage $V_{ref\_fly1}$ and the first restart phase angle $\theta_{ref\_fly1}$ generated in the first restart voltage reference generator 210 to the medium-voltage inverter 240. The medium-voltage inverter 240 is restarted as the first restart voltage $V_{ref\_fly1}$ and the first restart phase angle $\theta_{ref\_fly1}$ are applied thereto (step S14).

As described above, according to an exemplary embodiment of the present disclosure, the inverter restart device determines whether to restart inverter if there is a fault in the main supply of the inverter, such that the inverter can be restarted stably.

In addition, according to an exemplary embodiment of the present disclosure, the inverter restart device determines whether to restart an inverter based on the voltage of an electric motor in free rotation, such that it is possible to prevent failure in the inverter or the electric motor.

In addition, according to an exemplary embodiment of the present disclosure, the inverter restart device determines whether to restart an inverter based on induced electromotive force of an electric motor, such that it is possible to restart the electric motor in a restart zone without inrush current.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings.

What is claimed is:

1. An inverter that outputs voltage for driving an electric motor, the inverter comprising:
   a first restart voltage reference generator configured to receive three phase currents output from the electric motor, a frequency of the inverter and a rating current of the electric motor to output a first restart voltage and a first restart phase angle;

a second restart voltage reference generator configured to receive an inverter output voltage output from the inverter to output a second restart voltage and a second restart phase angle; and a switch unit configured to receive the first restart voltage, the first restart phase angle, the second restart voltage and the second restart phase angle to output a restart voltage and a phase angle according to a restart mode flag.

2. The inverter of claim 1, wherein the frequency of the inverter is measured at a start point of a restart zone in which the inverter is restarted.

3. The inverter of claim 2, wherein a maximum load torque generated by the electric motor and a load torque in the restart zone are calculated.

4. The inverter of claim 3, wherein the maximum load torque is calculated by multiplying the second restart voltage, a maximum rating current of the electric motor and a power factor, and dividing the multiplied second restart voltage, maximum rating current and power factor by a restart velocity.

5. The inverter of claim 3, wherein the load torque is calculated by dividing a magnitude of the inverter output voltage, a magnitude of a torque component current of the electric motor and a restart velocity output from the second restart voltage reference generator.

6. The inverter of claim 3, wherein the maximum load torque is compared with the load torque, and the restart mode flag is set based on the comparison result.

7. The inverter of claim 6, wherein the restart mode flag is set to one if the maximum load torque is larger than the load torque, and the switch unit outputs the second restart voltage and the second phase angle to the inverter.

8. The inverter of claim 6, wherein the restart mode flag is set to zero if the maximum load torque is smaller than the load torque, and the switch unit outputs the first restart voltage and the first phase angle to the inverter.

9. The inverter of claim 1, wherein the first restart voltage reference generator comprises:

a first voltage generator configured to receive the frequency of the inverter to generate the first restart voltage; and a first phase angle generator configured to receive the rating current of the electric motor and the three phase currents output from the electric motor to generate the first restart phase angle.

10. The inverter of claim 9, wherein the first phase angle generator comprises:

a first adder configured to add the rating current of the electric motor with the three phase currents output from the electric motor to output a result of an adding calculation;

an amplifier configured to adjust the result of the adding calculation output from the first adder depending on a predetermined gain to output an adjusted result; and a first integrator configured to integrate the adjusted result output from the amplifier to output a result of an integration calculation as the first restart phase angle.

11. The inverter of claim 1, wherein the second restart voltage reference generator comprises:

a voltage sensing unit configured to sense voltage output from the inverter;

a voltage measuring unit configured to receive the voltage sensed by the voltage sensing unit to output a d-axis voltage and a q-axis voltage on a stationary reference frame;

a voltage and phase detector configured to receive the d-axis voltage and the q-axis voltage to output a third restart voltage, a third restart phase angle and a restart velocity; and a restart voltage generator configured to receive the restart voltage, the restart phase angle and the restart velocity to output the second restart voltage and the second restart phase angle.

* * * * *